United States Patent
Kojima et al.

(10) Patent No.: US 12,422,858 B2
(45) Date of Patent: Sep. 23, 2025

(54) AIRCRAFT POSITION CONTROL SYSTEM, AIRCRAFT, AND AIRCRAFT POSITION CONTROL METHOD

(71) Applicant: MITSUBISHI HEAVY INDUSTRIES, LTD., Tokyo (JP)

(72) Inventors: Toru Kojima, Tokyo (JP); Satoshi Mori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/036,507

(22) PCT Filed: Jan. 13, 2022

(86) PCT No.: PCT/IB2022/050232
§ 371 (c)(1),
(2) Date: May 11, 2023

(87) PCT Pub. No.: WO2022/101894
PCT Pub. Date: May 19, 2022

(65) Prior Publication Data
US 2024/0012433 A1    Jan. 11, 2024

(51) Int. Cl.
*G05D 1/12*    (2006.01)
*G05D 1/00*    (2006.01)
(Continued)

(52) U.S. Cl.
CPC .............. *G05D 1/12* (2013.01); *G05D 1/106* (2019.05); *B64U 2101/30* (2023.01); *B64U 2201/00* (2023.01); *G05D 1/686* (2024.01)

(58) Field of Classification Search
CPC ............ B64U 2201/00; B64U 2101/30; G05D 1/244; G05D 1/686; G05D 2109/25;
(Continued)

(56) References Cited

U.S. PATENT DOCUMENTS

2005/0125142 A1*   6/2005  Yamane ............... G05D 1/0676
                                              701/510
2017/0292841 A1*  10/2017  Sabe ..................... G05D 1/102
(Continued)

FOREIGN PATENT DOCUMENTS

EP    4 026 770       7/2022
JP    11-183603       7/1999
(Continued)

OTHER PUBLICATIONS

Extended European Search Report issued Mar. 6, 2024 in European Patent Application No. 22723004.2.
(Continued)

*Primary Examiner* — Hitesh Patel
*Assistant Examiner* — Elle Rose Knudson
(74) *Attorney, Agent, or Firm* — Wenderoth, Lind & Ponack, L.L.P.

(57) ABSTRACT

An aircraft position control system that keeps an aircraft at target coordinates in an inertial space with respect to a target landing point that moves includes an acceleration correction processing unit that, based on acceleration of the aircraft and an attitude of the aircraft, outputs first attitude correction acceleration for correcting the acceleration of the aircraft, a complementary filter that, based on the first attitude correction acceleration and inertial velocity of the aircraft, outputs second attitude correction acceleration in which a drift component included in the first attitude correction acceleration is removed, and a smoothing processing unit that, based on the second attitude correction acceleration and relative coordinates between the aircraft and the target landing point, outputs smoothed relative coordinates obtained by smoothing the relative coordinates.

7 Claims, 7 Drawing Sheets

(51) Int. Cl.
*B64U 101/30* (2023.01)
*G05D 1/686* (2024.01)

(58) Field of Classification Search
CPC ...... G05D 2111/10; G05D 1/12; B64D 45/08;
B64D 45/04; B64C 13/18
See application file for complete search history.

(56) References Cited

U.S. PATENT DOCUMENTS

2020/0126239 A1* 4/2020 Qian .................... G01S 3/7864
2023/0027342 A1   1/2023 Kojima et al.

FOREIGN PATENT DOCUMENTS

| WO | WO-2013156588 A1 * | 10/2013 | ............ B25J 9/1623 |
| WO | WO-2019055690 A1 * | 3/2019 | ............. B64C 27/08 |
| WO | 2021/070517 | 4/2021 | |

OTHER PUBLICATIONS

Alexandre Borowczyk et al., "Autonomous ARXIV.ORG, Cornell University Library,. Landing of a Multirotor Micro Air Vehicle on a High Velocity Ground Vehicle", Cornell University, Ithaca, NY, 14853, Nov. 22, 2016, XP 80733738A.

* cited by examiner

AIRCRAFT POSITION CONTROL SYSTEM, AIRCRAFT, AND AIRCRAFT POSITION CONTROL METHOD

FIELD

The present disclosure relates to an aircraft position control system, an aircraft, and an aircraft position control method, and particularly to position control for spatial stable hovering of an aircraft.

BACKGROUND

Conventionally, a Doppler navigation device with an added function to output position information with excellent accuracy by reducing the effect of velocity errors due to Doppler frequency shift caused by the beam length change velocity that occurs when the aircraft attitude changes has been known (see, for example, Patent Literature 1). In this Doppler navigation device, a correction quantity is determined to compensate for the velocity error caused by the beam length change.

CITATION LIST

Patent Literature

Patent Literature 1: Japanese Patent Application Laid-open No. H11-183603

SUMMARY

Technical Problem

In Patent Literature 1, a Doppler navigation device that transmits radio waves from an aircraft toward a ground surface is used. The Doppler navigation device measures the velocity of the aircraft by correcting the velocity error. The velocity of the aircraft measured by the Doppler navigation device is used to control the position of the aircraft in flight. If the corrected velocity of the aircraft can be used in the flight control, it is possible to make the position less likely to deviate from a target landing point.

On the other hand, it has been known to measure the acceleration of the aircraft and perform flight control based on the measured acceleration in order to control the position of the aircraft in flight.

When an aircraft is to hover stably at target coordinates, the flight control of the aircraft is performed using the acceleration of the aircraft measured by an accelerometer as input information. In this case, the output value of the acceleration acquired by the accelerometer may include a drift component due to a drift phenomenon. If the aircraft is made to hover using output values of the acceleration that include the drift component, it is difficult to obtain accurate acceleration, and the position will deviate from the original target landing point, making it difficult to hover with high accuracy over the target landing point.

In view of this, it is an object of the present invention to provide an aircraft position control system, an aircraft, and an aircraft position control method that can stably keep the position of an aircraft in an inertial space.

Solution to Problem

An aircraft position control system according to the present disclosure keeps an aircraft at target coordinates in an inertial space with respect to a target landing point that fluctuates. The aircraft position control system includes: an acceleration correction processing unit that, based on acceleration of the aircraft and an attitude of the aircraft, outputs first attitude correction acceleration in which the acceleration of the aircraft is corrected; a complementary filter that, based on the first attitude correction acceleration and inertial velocity of the aircraft, outputs second attitude correction acceleration in which a drift component included in the first attitude correction acceleration is removed; and a smoothing processing unit that, based on the second attitude correction acceleration and relative coordinates between the aircraft and the target landing point, outputs smoothed relative coordinates obtained by smoothing the relative coordinates.

An aircraft according to the present disclosure includes: an acceleration acquisition unit that acquires acceleration of the aircraft; an attitude acquisition unit that acquires an attitude of the aircraft; an inertial velocity acquisition unit that acquires inertial velocity of the aircraft; a relative coordinate acquisition unit that acquires relative coordinates of the aircraft; and the above-described aircraft position control system.

An aircraft position control method according to the present disclosure is for keeping an aircraft at predetermined coordinates in an inertial space with respect to a target landing point that moves. The aircraft position control method includes the steps of: outputting, based on acceleration of the aircraft and an attitude of the aircraft, first attitude correction acceleration in which the acceleration of the aircraft is corrected; outputting, based on the first attitude correction acceleration and inertial velocity of the aircraft, second attitude correction acceleration in which a drift component included in the first attitude correction acceleration is removed; and outputting, based on the second attitude correction acceleration and relative coordinates between the aircraft and the target landing point, smoothed relative coordinates obtained by smoothing the relative coordinates.

Advantageous Effects of Invention

According to the present disclosure, even if the target landing point moves, the average position of the motion of the target landing point can be kept stably with only the information available on the aircraft side without being affected by the motion.

DESCRIPTION OF EMBODIMENTS

An embodiment of the present disclosure will hereinafter be described based on the drawings. This invention is not limited by the embodiment. In addition, the components in the following embodiment include those that can be replaced and easily conceived by those skilled in the art, or those that are substantially the same. Furthermore, the components described below can be combined as appropriate, and if there is more than one embodiment, the embodiments can be combined.

EMBODIMENT

Figure 1:
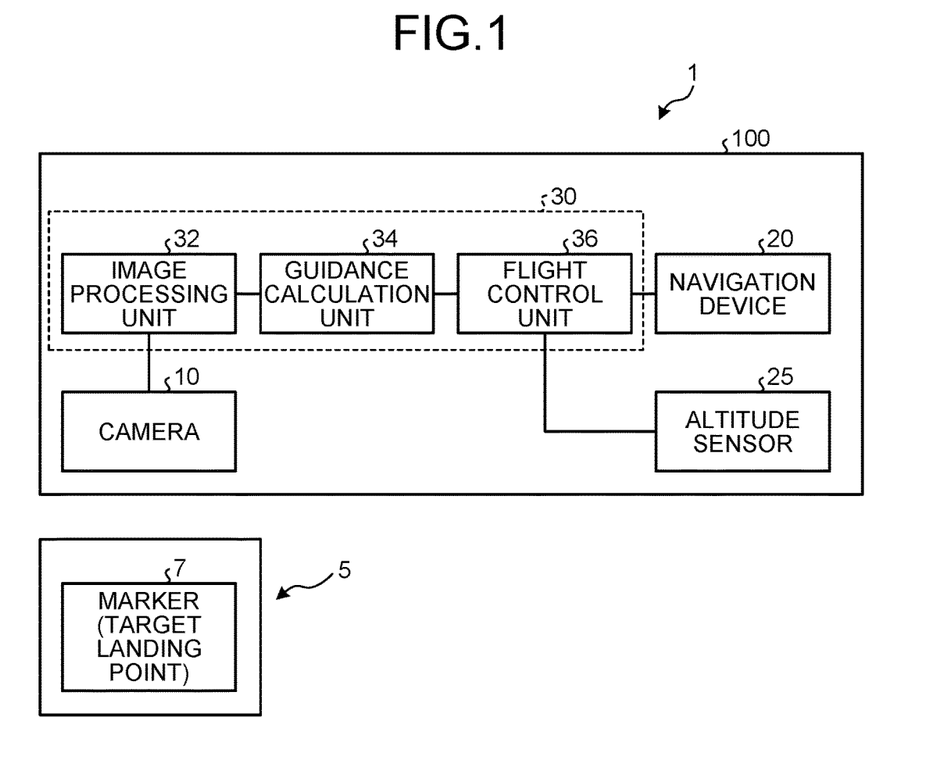
FIG. 1 is a schematic structure diagram illustrating one example of a position control system of an aircraft according to the present embodiment.
Figure 2:
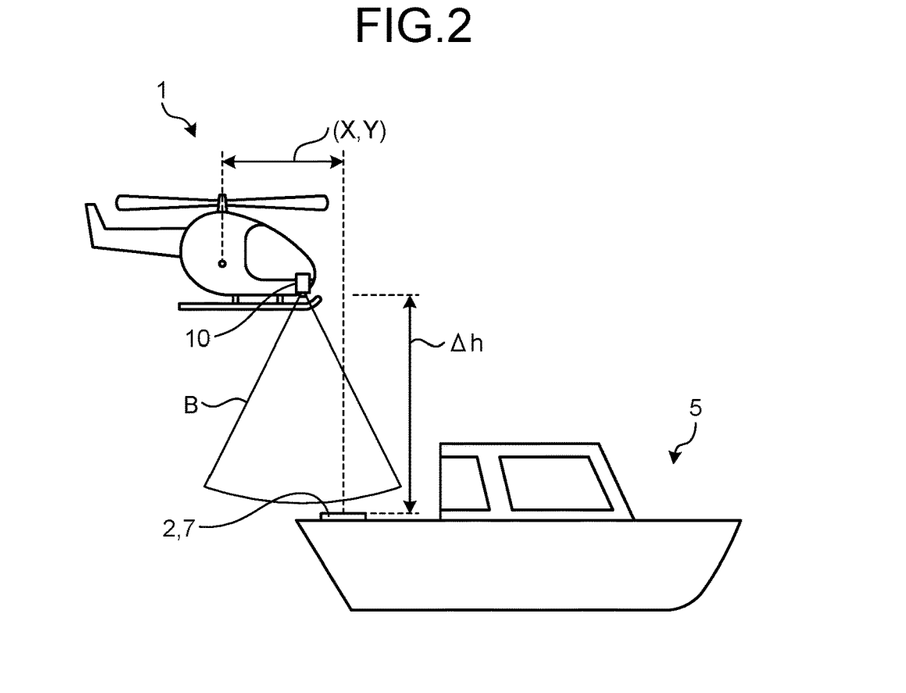
FIG. 2 is an explanatory diagram illustrating a state in which an aircraft according to the present embodiment heads to a target landing point.

FIG. 1 is a schematic structure diagram illustrating one example of a position control system of an aircraft according to the present embodiment, and FIG. 2 is an explanatory diagram illustrating a state in which the aircraft according to the present embodiment heads to a target landing point.

As illustrated in FIG. 1, an aircraft 1 is a flight vehicle as a rotorcraft (for example, helicopter, drone, etc.). In this embodiment, the aircraft 1 is an unmanned vehicle. The aircraft 1 may be any flight vehicle that can move forward, backward, sideways, swirl, and hover, and may be a manned vehicle. The aircraft 1 includes a position control system 100, and its flight is controlled by the position control system 100 so that the aircraft 1 lands at a target landing point 2 illustrated in FIG. 2.

Target Landing Point

In this embodiment, the target landing point 2 is provided on a vessel 5 as illustrated in FIG. 2. Therefore, the aircraft 1 lands on (lands on a deck of) the vessel 5 as a moving vehicle moving on the water. The vessel 5 includes a restraint device to restrain the aircraft 1 when the aircraft 1 lands at the target landing point 2, which is not illustrated in the drawing. However, the target landing point 2 is not limited to the vessel 5, and may alternatively be provided on a vehicle or the like as a moving object moving on the ground, or on non-moving equipment or on the ground.

Figure 3:
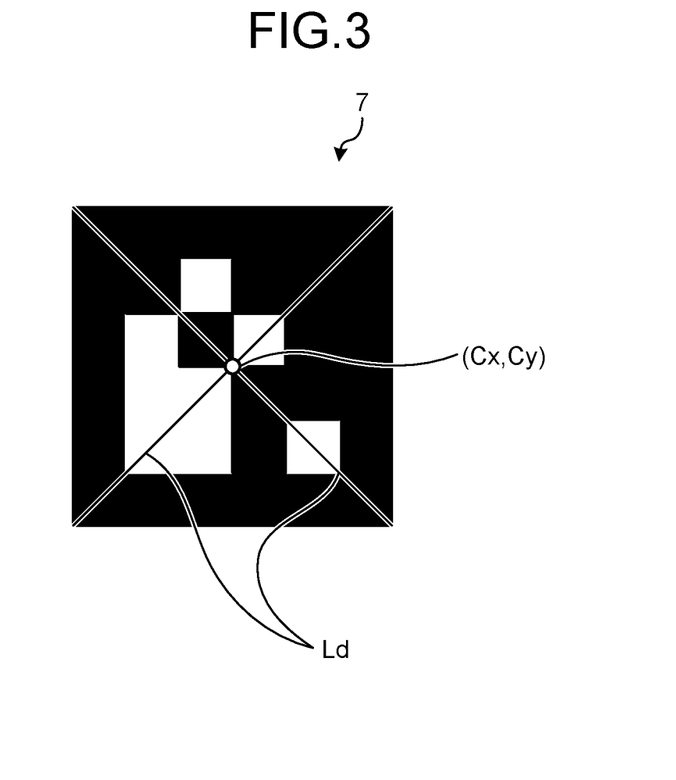
FIG. 3 is an explanatory diagram illustrating one example of a marker provided at the target landing point.

The target landing point 2 includes a marker 7 for the aircraft 1 to capture the position of the target landing point 2. FIG. 3 is an explanatory diagram illustrating one example of the marker provided at the target landing point. As illustrated in the drawing, the marker 7 is a square-shaped AR marker with two colors, black and white, for example. The marker 7 is not limited to the AR marker and may alternatively be any marker that can capture the position of the target landing point 2 by image processing, such as an H mark or an R mark indicating the landing point of a heliport. As the marker 7, a plurality of markers with different shapes may be provided on the vessel 5, and the aircraft 1 may be guided to the target landing point 2 corresponding to any of the different markers 7. In this embodiment, the marker 7 is provided on the vessel 5 to capture the position of the target landing point 2, but the configuration is not limited in particular as long as the position of the target landing point 2 can be acquired.

Position Control System

The position control system 100 for the aircraft according to this embodiment is a system for controlling the position of the aircraft 1 so that the aircraft 1 in flight lands at the target landing point 2. The position control system 100 is mounted on the aircraft 1. The position control system 100 includes a camera 10, a navigation device 20, and a control unit 30 as illustrated in FIG. 1.

The camera 10 is a photographing device mounted on the aircraft 1 via a gimbal that is not illustrated. The camera 10 may be a monocular camera, a compound-eye camera, an infrared camera, or the like, as long as the marker 7 can be photographed. The camera 10 is provided to photograph the marker 7 at the target landing point 2 from the aircraft 1. The camera 10 is able to adjust a photographing direction via the gimbal that is not illustrated. In this embodiment, the camera 10 is controlled by the control unit 30 so that its photographing range B (see FIG. 2) faces right downward in the vertical direction as one example. The camera 10 may be controlled by the control unit 30 so that the photographing range B faces forward at an angle to the vertical direction. The camera 10 may omit the gimbal and be fixed right under the body of the aircraft 1 so that the photographing direction faces downward in the vertical direction.

The navigation device 20 is, for example, an inertial navigation system (INS). In this embodiment, the navigation device 20 will be described in application to an inertial navigation system; however, any navigation device 20 may be used without particular limitations. The navigation device 20 may alternatively be an inertial navigation device that includes a global positioning system (GPS) to improve the accuracy of position measurement. In this embodiment, the application to the inertial navigation device including the GPS is described; however, it is not limited to the GPS and any position measurement unit that can measure the position with high accuracy may be used. For example, a quasi-zenith satellite system may be used. If the position can be measured with high accuracy only with the navigation device 20, the GPS or other position measurement unit may be omitted.

The navigation device 20 including the GPS acquires, for example, attitude angles of the aircraft 1 in a roll direction, a yaw direction, and a pitch direction, and aircraft velocity, inertial velocity, aircraft acceleration, a nose azimuth, and position coordinates in the earth coordinate system of the aircraft 1. The navigation device 20 may have an attitude angle sensor to detect the attitude angle of the aircraft 1, a velocity sensor to detect the aircraft velocity of the aircraft 1, an acceleration sensor to detect the aircraft acceleration of the aircraft 1, and a sensor to detect the nose azimuth of the aircraft 1. The navigation device 20 outputs the acquired attitude angle, aircraft velocity, inertial velocity, aircraft acceleration, nose azimuth, and position coordinates of the aircraft 1 to the control unit 30. Thus, the navigation device 20 functions as an acceleration acquisition unit to acquire the acceleration of the aircraft 1, an attitude acquisition unit to acquire the attitude of the aircraft 1, and an inertial velocity acquisition unit to acquire the inertial velocity of the aircraft 1.

The position control system 100 also includes an altitude sensor 25 that detects the altitude of the aircraft 1 from the ground or a water surface as illustrated in FIG. 1. The altitude sensor 25 is, for example, a laser altimeter, which measures relative altitude Δh (see FIG. 2) from the aircraft 1 to the target landing point 2. The altitude sensor 25 may be either a radio altimeter or a barometric altimeter. These altimeters may be used in combination as appropriate in accordance with the environment in which they are used, i.e., to measure the altitude from the ground surface and the altitude from the sea level. The altitude sensor 25 outputs the detected relative altitude Δh of the aircraft 1 to the control unit 30. The altitude sensor 25 may measure the altitude of the aircraft 1 and output the measured altitude to the control unit 30. The control unit 30 may cause a guidance calculation unit 34 described below to calculate the relative altitude Δh to the target landing point 2, based on the altitude of the aircraft 1. The position control system 100 may cause, instead of the altitude sensor 25, an image processing unit 32, which is described below, to calculate the relative altitude Δh between the aircraft 1 and the vessel 5 by applying image processing to an image including the marker 7 photographed by the camera 10.

Control Unit

The control unit 30 includes the image processing unit 32, the guidance calculation unit 34, and a flight control unit 36. The control unit 30 includes a photographing control unit, which is not illustrated, that controls the photographing direction of the camera 10 via a gimbal, which is not illustrated, that is installed in the aircraft 1. In this embodiment, the camera 10 is adjusted so that the photographing range B of the camera 10 faces right downward in the vertical direction as described above.

Image Processing Unit

The image processing unit 32 applies image processing to an image photographed by the camera 10 to calculate a center (Cx, Cy) (see FIG. 3) of the marker 7, that is, the target landing point 2. The center (Cx, Cy) here is a point of coordinates in a camera fixed coordinate system whose origin is the center of the image photographed by the camera 10, and can be calculated based on the number of pixels from the center of the image. Specifically, as illustrated in FIG. 3, the image processing unit 32 specifies two diagonal lines Ld that extend between the corners of the marker 7 by image processing, and sets the intersection of the two specified diagonal lines Ld as the center (Cx, Cy) of the marker 7. The target landing point 2 is not limited to the center of the marker 7 (Cx, Cy), and may be any of the four corners of the marker 7 or offset from the center of the marker 7. The image processing unit 32 outputs the calculated center (Cx, Cy) of the marker 7 to the guidance calculation unit 34.

The image processing unit 32 may also calculate a bow azimuth of the vessel 5 by applying image processing to the image including the marker 7 photographed by the camera 10 to specify the direction of the marker 7 and mapping the direction to the nose azimuth of the aircraft 1, which is acquired by the navigation device 20. The image processing unit 32 may calculate the relative altitude Δh between the aircraft 1 and the vessel 5 by applying image processing to the image including the marker 7 photographed by the camera 10 as described above.

Guidance Calculation Unit

The guidance calculation unit 34 calculates the control quantity of the aircraft 1 to guide the aircraft 1 to the target landing point 2. The control quantity is the control quantity for adjusting the aircraft velocity, the attitude angle, the rate of change of the attitude angle, etc. of the aircraft 1. The guidance calculation unit 34 calculates relative coordinates between the aircraft 1 and the target landing point 2 in order to calculate the control quantity. Specifically, the guidance calculation unit 34 calculates the relative position (X, Y) between the aircraft 1 and the target landing point 2 as the relative coordinates, the relative altitude Δh between the aircraft 1 and the target landing point 2, the relative velocity between the aircraft 1 and the target landing point 2, and the like. The relative position (X, Y) is the distance between the aircraft 1 and the target landing point 2 in the horizontal direction. The relative altitude Δh is the distance between the aircraft 1 and the target landing point 2 in the vertical direction.

The guidance calculation unit 34 calculates the relative position (X, Y) between the aircraft 1 and the target landing point 2, based on the center (Cx, Cy) of the marker 7 calculated by the image processing unit 32, the azimuth of the camera 10, i.e., the nose azimuth of the aircraft 1, and the altitude of the aircraft 1 (relative altitude Δh to the target landing point 2). In this embodiment, the azimuth of the camera 10 is aligned with the nose azimuth of the aircraft 1, but the embodiment is not limited to this example and the azimuth of the camera 10 does not have to be aligned with the nose azimuth of the aircraft 1. Thus, the image processing unit 32 and the guidance calculation unit 34 function as a relative position acquisition unit (relative coordinate acquisition unit) to acquire the relative position between the aircraft 1 and the target landing point 2.

The guidance calculation unit 34 calculates the relative altitude Δh to the target landing point 2, based on the altitude of the aircraft 1 detected by the altitude sensor 25. Therefore, the altitude sensor 25 and the guidance calculation unit 34 function as a relative altitude acquisition unit (relative coordinate acquisition unit) to acquire the relative altitude Δh between the aircraft 1 and the target landing point 2. When the relative altitude Δh between the aircraft 1 and the vessel 5 is calculated by applying image processing to the image including the marker 7 photographed by the camera 10 in the image processing unit 32, the image processing unit 32 serves as the relative altitude acquisition unit.

The guidance calculation unit 34 also calculates the relative velocity between the aircraft 1 and the target landing point 2. Therefore, the guidance calculation unit 34 functions as the relative velocity acquisition unit to acquire the relative velocity between the aircraft 1 and the target landing point 2. More specifically, the guidance calculation unit 34 executes a relative velocity calculation process of calculating relative velocity (ΔVx, ΔVy) between the aircraft 1 and the target landing point 2 on the basis of the relative position (X, Y) and the aircraft velocity (Vx, Vy). Therefore, the guidance calculation unit 34 functions as the relative velocity acquisition unit to acquire the relative velocity (ΔVx, ΔVy) between the aircraft 1 and the target landing point 2.

The guidance calculation unit 34 then calculates the control quantity by feedback control (for example, PID control), based on the relative position (X, Y), the relative altitude Δh, the relative velocity (ΔVx, ΔVy), and the aircraft acceleration. The feedback control is not limited to PID control, and may be P control, PI control, PD control, or the like. The guidance calculation unit 34 outputs a calculated control quantity C' (see FIG. 4 and FIG. 5) to the flight control unit 36.

Flight Control Unit

The flight control unit 36 controls each component of the aircraft 1 to fly the aircraft 1 according to the control quantity calculated by the guidance calculation unit 34. The flight control unit 36 controls the blade pitch angle, rotation velocity, etc. of each rotor blade according to the control quantity, so as to adjust the aircraft velocity, attitude angle, rate of change of the attitude angle, etc. of the aircraft 1. The aircraft 1 is thereby guided to the target landing point 2. Although the image processing unit 32 and the guidance calculation unit 34 are described in this embodiment as functional units separate from the flight control unit 36, the flight control unit 36, the image processing unit 32, and the guidance calculation unit 34 may be an integral functional unit. In other words, the process in the image processing unit 32 and the guidance calculation unit 34 may be performed in the flight control unit 36.

Aircraft Position Control

Figure 8:
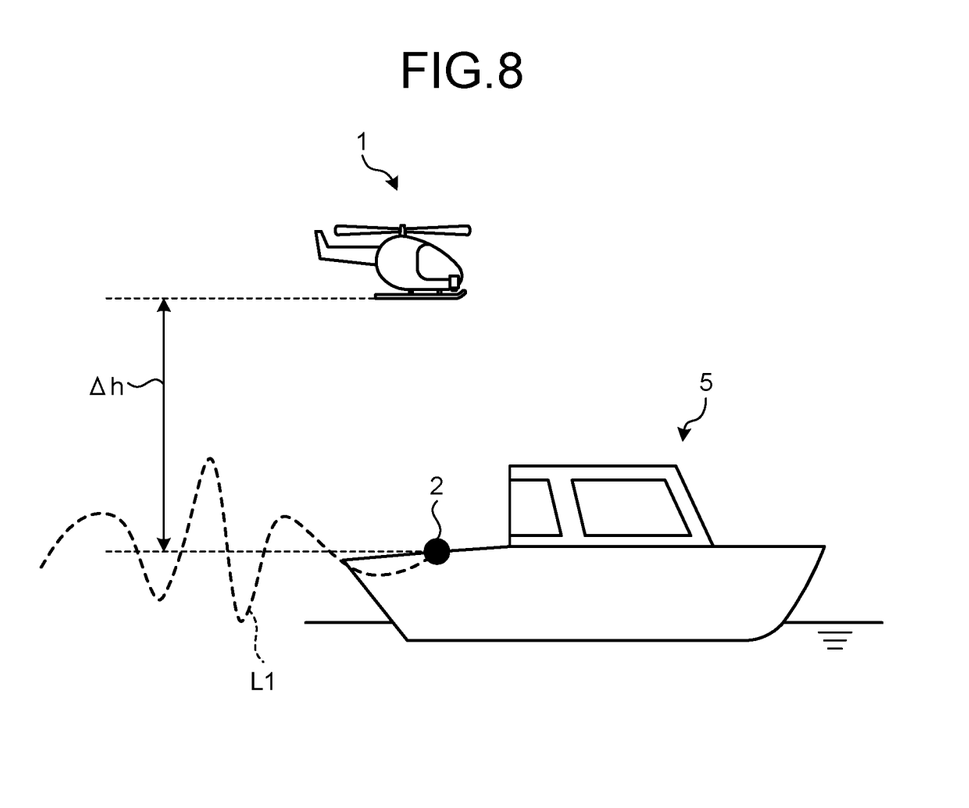
FIG. 8 is an explanatory diagram illustrating one example about position control of the aircraft according to the present embodiment.

Next, the position control of the aircraft 1 according to this embodiment is described with reference to FIG. 4 and FIG. 5. In the position control of the aircraft 1, spatial stable hovering, which executes stable hovering in the space, is performed. With reference to FIG. 8, the spatial stable hovering is described here. FIG. 8 is an explanatory diagram illustrating one example about the position control of the aircraft according to the present embodiment. A line L1 in FIG. 8 indicates a position of the target landing point 2, which changes over time due to motion such as waves. As illustrated in FIG. 8, the spatial stable hovering is the flight control to perform the hovering so that the relative altitude Δh and the relative position (X, Y) between the aircraft 1 and the target landing point 2 in which the displacement quantity due to the motion is smoothed (averaged) coincide with the target relative altitude and the target relative position even if the relative altitude Δh and the relative position (X, Y) between the aircraft 1 and the target landing point 2 change over time due to motion such as waves. When the relative position (X, Y) and the relative altitude Δh are measured using the altitude sensor 25, etc., their values are instantaneous values that include mutual motion, so that changes due to motion or the like are also included. Therefore, a smoothing process is required to remove the changes due to motion or the like, and control needs to be performed on the smoothed position/altitude. In other words, in the spatial stable hovering, the flight of the aircraft 1 is controlled so that the difference between the smoothed (average) relative altitude Δh and the target relative altitude is zero, and additionally, the flight of the aircraft 1 is controlled so that the difference between the smoothed (average) relative position (X, Y) and the target relative position is zero.

Figure 4:
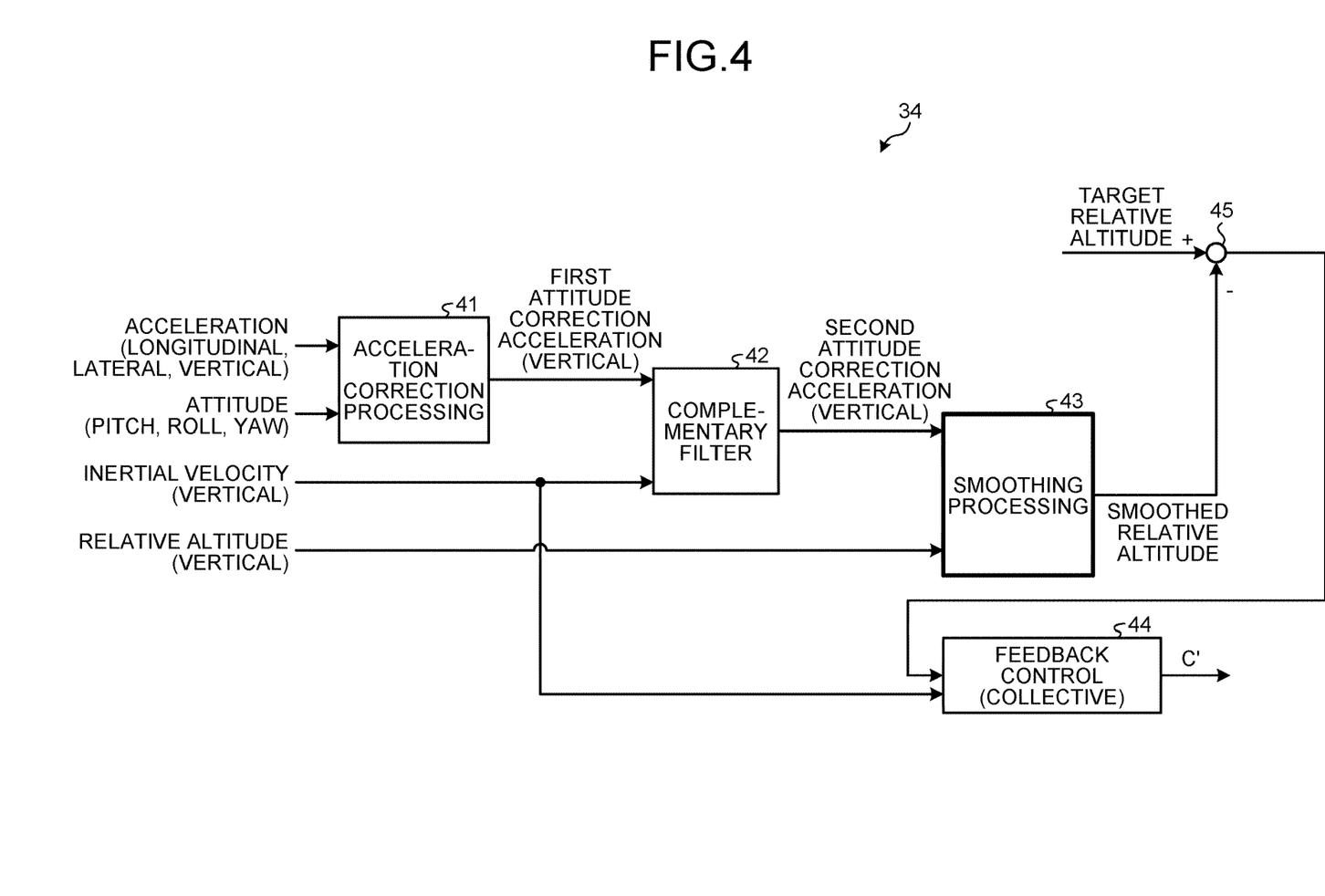
FIG. 4 is a block diagram illustrating one example of calculating smoothed relative altitude of the aircraft.

FIG. 4 is a block diagram illustrating one example of calculating the smoothed relative altitude of the aircraft. FIG. 5 is a block diagram illustrating one example of calculating the smoothed relative position of the aircraft. In the position control of the aircraft 1, the guidance calculation unit 34 performs the position control about the spatial stable hovering, which keeps the aircraft at the target coordinates in the space with respect to the target landing point 2, based on the block diagrams in FIG. 4 and FIG. 5. For this reason, the guidance calculation unit 34 calculates the control quantity of the aircraft 1 to execute the spatial stable hovering.

Spatial Stable Hovering about Relative Altitude

In FIG. 4, the position control about the spatial stable hovering is performed so that the difference between the smoothed relative altitude and the target relative altitude is zero. The guidance calculation unit 34 includes an acceleration correction processing unit 41, a complementary filter 42, a smoothing processing unit 43, and a feedback control unit 44. The acceleration correction processing unit 41, the complementary filter 42, and the smoothing processing unit 43 may be implemented by the guidance calculation unit 34, by a processing unit separate from the guidance calculation unit 34, or by a combination thereof, without particular limitations.

The acceleration correction processing unit 41 outputs first attitude correction acceleration in which the acceleration of the aircraft 1 is corrected, based on the acceleration of the aircraft 1 and the attitude of the aircraft 1. The attitude correction acceleration is the acceleration in an aircraft axis coordinate system converted to acceleration in an inertial space coordinate system by a coordinate conversion on the basis of the attitude angle of the aircraft 1. Specifically, to the acceleration correction processing unit 41, the acceleration of the aircraft 1 acquired in the navigation device 20 is input, and the attitude angle of the aircraft 1 acquired in the navigation device 20 is also input. The acceleration to be input includes longitudinal (front-rear direction in the aircraft coordinate system), lateral (left-right direction in the aircraft coordinate system), and vertical (up-down direction in the aircraft coordinate system) acceleration. The attitude angles to be input include the attitude angles in the pitch axis, the roll axis, and the yaw axis. Upon the input of the acceleration of the aircraft 1 and the attitude angle of the aircraft 1, the acceleration correction processing unit 41 calculates the first attitude correction acceleration in which the acceleration of the aircraft 1 in the vertical direction is corrected. The acceleration correction processing unit 41 outputs the calculated first attitude correction acceleration to the complementary filter 42.

The complementary filter 42 outputs second attitude correction acceleration in which the drift component included in the first attitude correction acceleration is removed, based on the first attitude correction acceleration and the inertial velocity of the aircraft 1. Specifically, to the complementary filter 42, the first attitude correction acceleration output from the acceleration correction processing unit 41 is input, and the inertial velocity of the aircraft 1 in the vertical direction acquired in the navigation device 20 is also input. The inertial velocity to be input is the velocity in the aircraft inertial system with the aircraft 1 as the origin. Upon the input of the first attitude correction acceleration and the inertial velocity of the aircraft 1, the complementary filter 42 combines a high-frequency component in which a low-frequency component included in the output value of the first attitude correction acceleration is removed, and a low-frequency component included in a derivative of the inertial velocity, and outputs the second attitude correction acceleration in the vertical direction.

Figure 6:
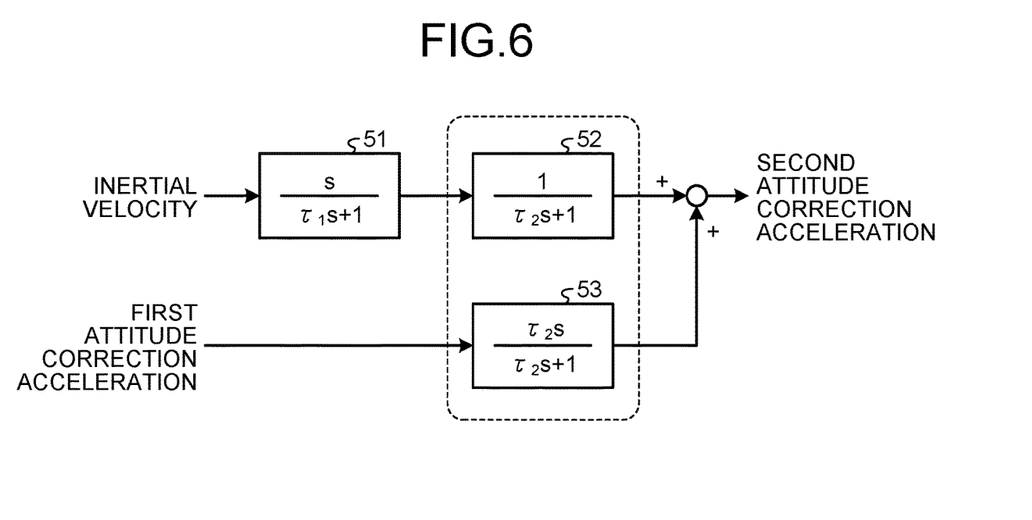
FIG. 6 is a block diagram illustrating one example of a process in a complementary filter.

FIG. 6 is a block diagram illustrating one example of the process in the complementary filter. As illustrated in FIG. 6, the complementary filter 42 includes a pseudo-differential filter 51, a low-pass filter 52, and a high-pass filter 53. The pseudo-differential filter 51 is a filter that applies pseudo-differentiation to the inertial velocity to obtain an acceleration component. A transfer function G1(S) of the pseudo-differential filter 51 is expressed by the following Equation (1). In Equation (1), "s" is the operator and "τ1" is the time constant.

$$G1(S)=s/(\tau 1 \cdot s+1) \quad (1)$$

The low-pass filter 52 is a filter that attenuates frequencies of a predetermined cutoff frequency or more for the derivative of the inertial velocity input from the pseudo-differential filter 51. A transfer function G2(s) of the low-pass filter 52 is expressed by Equation (2). In Equation (2), "s" is the operator and "τ2" is the time constant. Therefore, the predetermined cutoff frequency is "1/τ2". Thus, by passing the derivative of the inertial velocity through the low-pass filter 52, the low-frequency component included in the derivative of the inertial velocity can be obtained.

$$G2(S)=1/(\tau 2 \cdot s+1) \quad (2)$$

The high-pass filter 53 is a filter that attenuates the frequencies below the predetermined cutoff frequency for the first attitude correction acceleration. A transfer function G3(s) of the high-pass filter 53 is expressed by Equation (3). In Equation (3), "s" is the operator and "τ2" is the time constant common to the low-pass filter 52. Therefore, the predetermined cutoff frequency is "1/τ2" in the high-pass filter 53 as well. Thus, by passing the first attitude correction acceleration in the vertical direction through the high-pass filter 53, the high-frequency component in the first attitude correction acceleration can be obtained.

$$G3(S)=\tau 2\cdot s/(\tau 2\cdot s+1) \tag{3}$$

The complementary filter 42 then combines the low-frequency component included in the derivative of the inertial velocity output from the low-pass filter 52 and the high-frequency component included in the first attitude correction acceleration output from the high-pass filter 53 to calculate the second attitude correction acceleration. In this way, the complementary filter 42 removes the low-frequency component as the drift component included in the first attitude correction acceleration. After this, the complementary filter 42 outputs the calculated second attitude correction acceleration to the smoothing processing unit 43.

The smoothing processing unit 43 performs the process for the flight control so that the relative altitude Δh between the aircraft 1 and the target landing point 2, in which the displacement quantity due to motion is smoothed (averaged), coincides with the target relative altitude, even when the target landing point 2 changes due to motion. The smoothing processing unit 43 outputs the smoothed relative altitude Δh in which the relative altitude Δh is smoothed, based on the second attitude correction acceleration and the relative altitude Δh. Specifically, to the smoothing processing unit 43, the second attitude correction acceleration output from the complementary filter 42 is input and the relative altitude Δh calculated by the guidance calculation unit 34 is also input. Upon the input of the second attitude correction acceleration and the relative altitude ah, the smoothing processing unit 43 calculates the smoothed relative altitude Δh to make the relative altitude Δh between the aircraft 1 and the target landing point 2 in which the displacement quantity due to the motion is smoothed (averaged) coincide with the target relative altitude. The smoothing processing unit 43 then outputs the calculated smoothed relative altitude Δh to a subtraction circuit unit 45. The subtraction circuit unit acquires the target relative altitude and calculates the difference between the acquired target relative altitude and the smoothed relative altitude Δh input from the smoothing processing unit 43. The subtraction circuit unit 45 then outputs the calculated difference to the feedback control unit 44.

The feedback control unit 44 acquires the inertial velocity of the aircraft 1 and calculates the control quantity C' on the basis of the acquired inertial velocity of the aircraft 1 and the difference between the target relative altitude and the smoothed relative altitude Δh input from the subtraction circuit unit 45. The feedback control unit 44 then outputs the calculated control quantity C' to the flight control unit 36. The flight control unit 36 executes the flight control on the basis of the control quantity C'. As an example of the flight control by the flight control unit 36, when the aircraft 1 is a helicopter, the flight control is performed to change the angle of the collective pitch angle of the rotating blades on the helicopter.

Figure 9:
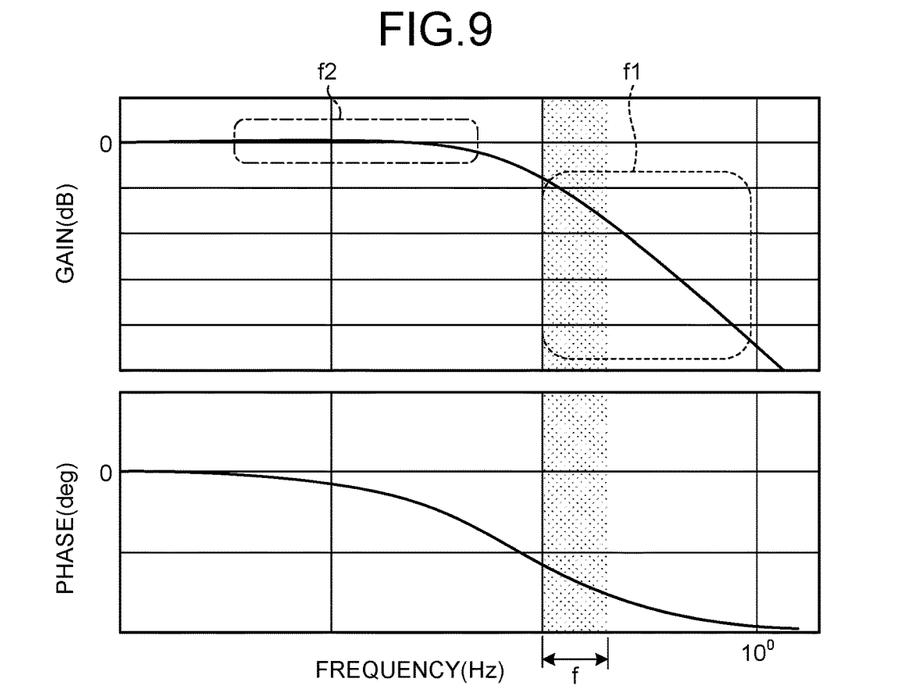
FIG. 9 is a Bode diagram from relative altitude to the smoothed relative altitude of a smoothing processing unit.

Here, with reference to FIG. 9, the signal processing related to the relative altitude in the smoothing processing unit 43 is described. FIG. 9 is a Bode diagram from the relative altitude to the smoothed relative altitude of the smoothing processing unit. In FIG. 9, its horizontal axis expresses frequency, and its vertical axis expresses a gain (dB) and a phase (deg). In FIG. 9, the frequency band where motion occurs is a motion frequency band f, and the frequency band that includes the motion frequency band f and is higher than or equal to the motion frequency band f is a frequency band f1 (first frequency band) and the frequency band that is lower than the motion frequency band f1 is a frequency band f2 (second frequency band).

The smoothing processing unit 43 amplifies the output signal by applying a gain to the input signal. The input signal is the relative altitude Δh and the output signal is the smoothed relative altitude Δh. As illustrated in FIG. 9, the frequency band f1 has a sufficiently low gain compared to the frequency band f2, which reduces the effect of the motion in the frequency band f1. The frequency band f2 has a large damping coefficient (ζ>0.7) so that the low-frequency disturbance response is not oscillatory. Overshoot is suppressed as the value of the damping factor ζ is increased, and desirable results are obtained if ζ>0.7.

Spatial Stable Hovering about Relative Position

Figure 5:
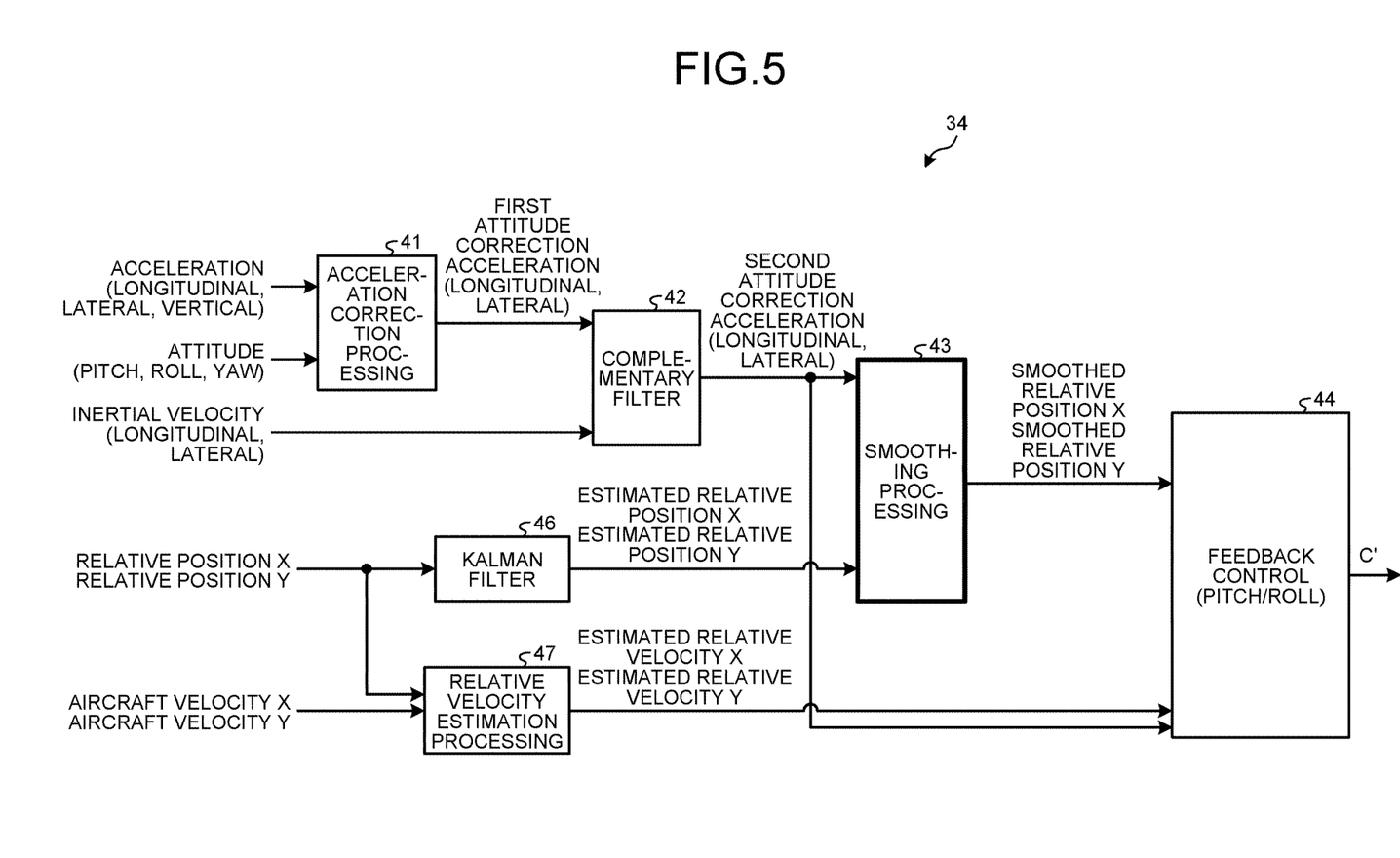
FIG. 5 is a block diagram illustrating one example of calculating a smoothed relative position of the aircraft.

In FIG. 5, the position control about the spatial stable hovering is performed so that the difference between the smoothed relative position and the target relative position is zero. The guidance calculation unit 34 includes the acceleration correction processing unit 41, the complementary filter 42, the smoothing processing unit 43, the feedback control unit 44, a Kalman filter 46, and a relative velocity estimation processing unit 47. The acceleration correction processing unit 41, the complementary filter 42, the smoothing processing unit 43, the Kalman filter 46, and the relative velocity estimation processing unit 47 may be implemented by the guidance calculation unit 34, by a processing unit separate from the guidance calculation unit 34, or by a combination thereof, without particular limitations. In FIG. 5, the component in the X direction, which is the direction of the pitch axis, and the component in the Y direction, which is the direction of the roll axis, are expressed together, and the control quantity for each component is calculated by the guidance calculation unit 34.

In a manner similar to the above, the acceleration correction processing unit 41 outputs the first attitude correction acceleration corresponding to the corrected acceleration of the aircraft 1 on the basis of the acceleration of the aircraft 1 and the attitude of the aircraft 1. Upon the input of the acceleration of the aircraft 1 and the attitude angle of the aircraft 1, the acceleration correction processing unit 41 calculates the first attitude correction acceleration corresponding to the corrected acceleration of the aircraft 1 in the longitudinal direction and the lateral direction. The acceleration correction processing unit 41 outputs the calculated first attitude correction acceleration to the complementary filter 42.

In a manner similar to the above, the complementary filter 42 outputs the second attitude correction acceleration in which the drift component included in the first attitude correction acceleration is removed, based on the first attitude correction acceleration and the inertial velocity of the aircraft 1. Specifically, to the complementary filter 42, the first attitude correction acceleration output from the acceleration correction processing unit 41 is input, and the inertial velocity of the aircraft 1 in the longitudinal direction and the lateral direction acquired in the navigation device 20 is also input. Upon the input of the first attitude correction acceleration and the inertial velocity of the aircraft 1, the complementary filter 42 combines the high-frequency component in which the low-frequency component included in the output value of the first attitude correction acceleration is removed, and the low-frequency component included in the derivative of the inertial velocity, and outputs the second attitude correction acceleration in the longitudinal direction and the lateral direction. The complementary filter 42 outputs the second attitude correction acceleration to the smoothing processing unit 43 and the feedback control unit 44. The complementary filter 42 is similar to that in FIG. 6.

The Kalman filter 46 performs an estimation based on the relative position (X, Y) and outputs the estimated relative position (X, Y) after the estimation. Specifically, the relative position (X, Y) calculated by the guidance calculation unit 34 is input to the Kalman filter 46. Upon the input of the relative position (X, Y), the Kalman filter 46 calculates the estimated relative position (X, Y) by estimating the change of the relative position (X, Y) over time. The Kalman filter 46 outputs the calculated estimated relative position (X, Y) to the smoothing processing unit 43.

The smoothing processing unit 43 outputs a smoothed relative position (X, Y), in which the estimated relative position (X, Y) is smoothed, on the basis of the second attitude correction acceleration and the estimated relative position (X, Y). Specifically, to the smoothing processing unit 43, the second attitude correction acceleration output from the complementary filter 42 is input, and the estimated relative position (X, Y) calculated by the Kalman filter 46 is also input. Upon the input of the second attitude correction acceleration and the estimated relative position (X, Y), the smoothing processing unit 43 calculates the smoothed relative position (X, Y) to make the relative position between the aircraft 1 and the target landing point 2 in which the displacement quantity due to motion is smoothed (averaged) coincide with the target relative position. The smoothing processing unit 43 then outputs the calculated smoothed relative position (X, Y) to the feedback control unit 44.

The relative velocity estimation processing unit 47 outputs the estimated relative velocity on the basis of the relative position (X, Y) and the aircraft velocity of the aircraft 1. Specifically, to the relative velocity estimation processing unit 47, the relative position (X, Y) calculated by the guidance calculation unit 34 is input, and the aircraft velocity of the aircraft 1 in the longitudinal direction and the lateral direction acquired by the navigation device 20 is also input. The relative velocity estimation processing unit 47 estimates the relative velocity from the relative position (X, Y) and the aircraft velocity that are input, and outputs the estimated relative velocity to the feedback control unit 44.

The feedback control unit 44 calculates the control quantity C' on the basis of the second attitude correction acceleration input from the complementary filter 42, the smoothed relative position (X, Y) input from the smoothing processing unit 43, and the estimated relative velocity input from the relative velocity estimation processing unit 47. The feedback control unit 44 then outputs the calculated control quantity C' to the flight control unit 36. The flight control unit 36 executes the flight control on the basis of the control quantity C'. As an example of the flight control by the flight control unit 36, when the aircraft 1 is a helicopter, the flight control is performed by tilting the helicopter's main rotor in the longitudinal direction and the lateral direction.

Figure 10:
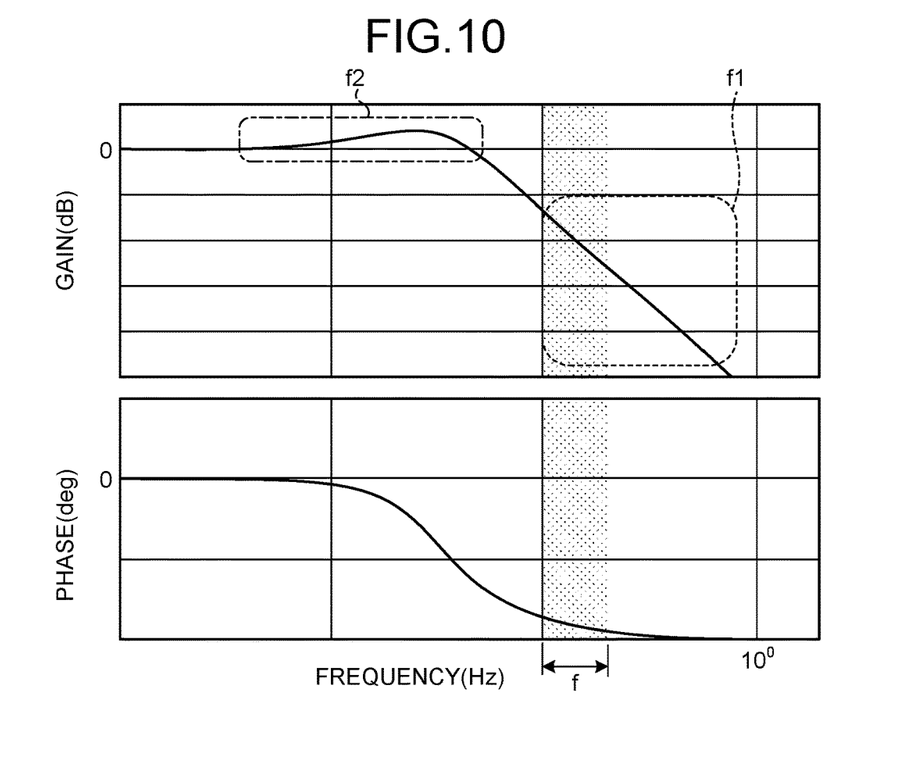
FIG. 10 is a Bode diagram from a relative position to the smoothed relative position of the smoothing processing unit.

With reference to FIG. 10, the signal processing related to the relative position in the smoothing processing unit 43 is described. FIG. 10 is a Bode diagram from the relative position to the smoothed relative position of the smoothing processing unit. In FIG. 10, its horizontal axis expresses frequency, and its vertical axis expresses a gain (dB) and a phase (deg). In FIG. 10, in a manner similar to FIG. 9, the frequency band where motion occurs is the motion frequency band f, and the frequency band that includes the motion frequency band f and is higher than or equal to the motion frequency band f is the frequency band f1 (first frequency band) and the frequency band that is lower than the motion frequency band f1 is the frequency band f2 (second frequency band).

The smoothing processing unit 43 amplifies the output signal by applying a gain to the input signal. The input signal is the estimated relative position (X, Y) and the output signal is the smoothed relative position (X, Y). As illustrated in FIG. 10, the frequency band f1 has a sufficiently low gain compared to the frequency band f2, similar to FIG. 9, which reduces the effect of the motion in the frequency band f1. The frequency band f2 has a large damping coefficient ($\zeta > 0.7$), similar to the relative altitude, so that the low-frequency disturbance response is not oscillatory. Overshoot is suppressed as the value of the damping factor (is increased, and desirable results are obtained if $\zeta > 0.7$.

Aircraft Position Control Method

Figure 7:
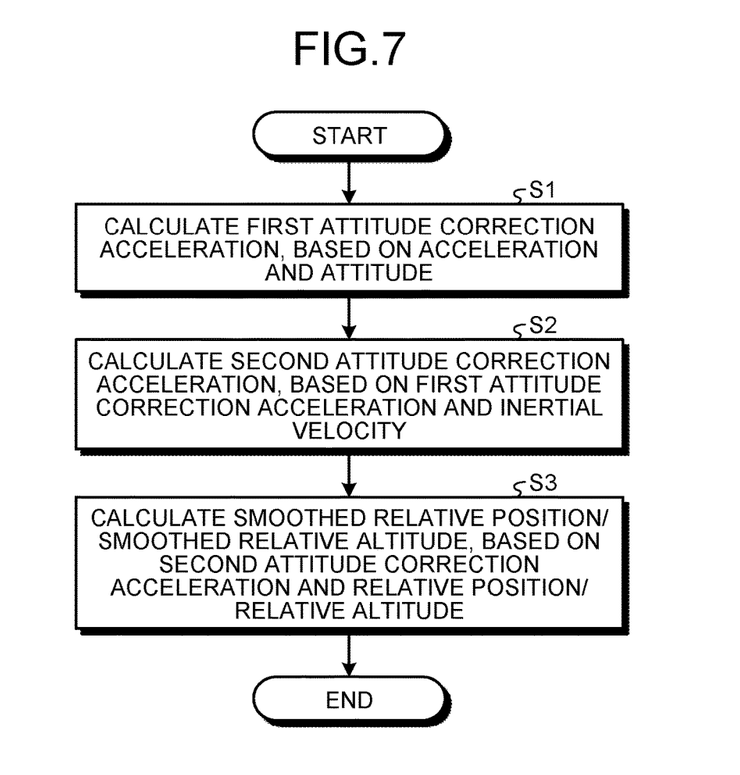
FIG. 7 is a flowchart illustrating one example about a position control method for the aircraft according to the present embodiment.

Next, with reference to FIG. 7, a position control method using the position control system 100 for the aircraft 1 according to the present embodiment, specifically, the smoothing process until the smoothed relative altitude Δh and the smoothed relative position (X, Y) are calculated in the smoothing processing unit 43 is described. FIG. 7 is a flowchart expressing one example about the position control method for the aircraft according to the present embodiment. FIG. 7 illustrates the smoothing process about the relative altitude and the relative position, and also the smoothing process until the smoothed relative altitude Δh and the smoothed relative position (X, Y) are output from the smoothing processing unit 43.

In the smoothing process, the acceleration correction processing unit 41 first outputs the first attitude correction acceleration on the basis of the acceleration of the aircraft 1 and the attitude of the aircraft 1 that are input (step S1). At step S1, for the position control about the relative altitude Δh, the acceleration correction processing unit 41 outputs the first attitude correction acceleration in the vertical direction. At step S1, in the case of the position control regarding the relative position (X, Y), the acceleration correction processing unit 41 outputs the first attitude correction acceleration in the longitudinal direction and the lateral direction.

Then, in the position control method for the aircraft 1, the complementary filter 42 outputs the second attitude correction acceleration on the basis of the first attitude correction acceleration and the inertial velocity of the aircraft 1 (step S2). At step S2, the drift component included in the first attitude correction acceleration is removed by removing the low-frequency component of the first attitude correction acceleration. At step S2, in the case of the position control about the relative altitude Δh, the complementary filter 42 outputs the second attitude correction acceleration in the vertical direction. At step S2, in the case of the position control about the relative position (X, Y), the complementary filter 42 outputs the second attitude correction acceleration in the longitudinal direction and the lateral direction.

After that, in the position control method for the aircraft 1, the smoothing processing unit 43 outputs the smoothed relative altitude Δh and the smoothed relative position (X, Y) on the basis of the second attitude correction acceleration in the vertical direction and the relative altitude Δh and the second attitude correction acceleration in the longitudinal direction and the lateral direction and the estimated relative position (X, Y) (step S3).

As described above, the position control system 100 for the aircraft 1, the aircraft 1, and the position control method for the aircraft 1 according to the embodiment are understood as follows, for example.

The position control system 100 for the aircraft 1 according to a first aspect is the position control system 100 for the aircraft 1 that keeps the aircraft 1 at target coordinates in an inertial space with respect to the target landing point 2 that moves, and includes: the acceleration correction processing unit 41 that, based on acceleration of the aircraft 1 and an attitude of the aircraft 1, outputs first attitude correction acceleration for correcting the acceleration of the aircraft 1; the complementary filter 42 that, based on the first attitude correction acceleration and inertial velocity of the aircraft 1, outputs second attitude correction acceleration in which a drift component included in the first attitude correction acceleration is removed; and the smoothing processing unit 43 that, based on the second attitude correction acceleration and relative coordinates between the aircraft 1 and the target landing point 2, outputs smoothed relative coordinates obtained by smoothing the relative coordinates.

With this configuration, the drift component included in the first attitude correction acceleration output based on the acquired acceleration of the aircraft 1 can be removed in the complementary filter 42. Therefore, since the smoothed relative coordinates can be acquired using the second attitude correction acceleration from which the drift component has been removed, the position of the aircraft 1 in the space can be stably kept even when the target landing point 2 moves.

In a second aspect, the complementary filter 42 combines a high-frequency component in which a low-frequency component included in an output value of the first attitude correction acceleration is removed, and the low-frequency component included in a derivative of the inertial velocity, and outputs the second attitude correction acceleration.

With this configuration, the drift component can be suitably removed by removing the low-frequency component included in the output value of the first attitude correction acceleration. The removed low-frequency component can be suitably interpolated by the inertial velocity.

In a third aspect, the relative coordinates include at least one of relative altitude Δh between the aircraft and the target landing point in the vertical direction and a relative position (X, Y) between the aircraft and the target landing point in the horizontal plane.

With this configuration, the position of the aircraft 1 can be kept stable at the relative altitude Δh and the relative position (X, Y).

In a fourth aspect, when the relative coordinates include the relative position (X, Y), the smoothing processing unit 43 outputs a smoothed relative position as the smoothed relative coordinates, the position control system 100 further includes the relative velocity estimation processing unit 47 that, based on aircraft velocity of the aircraft 1 and the relative position (X, Y), outputs estimated relative velocity obtained by estimating relative velocity between the aircraft 1 and the target landing point 2, and the flight of the aircraft 1 is controlled based on the estimated relative velocity and the smoothed relative position.

With this configuration, the position control for the target landing point 2 can be performed with high accuracy at the relative position (X, Y).

In a fifth aspect, the position control system 100 further includes the Kalman filter 46 that, when the relative coordinates include the relative position (X, Y), outputs an estimated relative position estimated based on the relative position (X, Y), and the smoothing processing unit 43 outputs the smoothed relative position as the smoothed relative coordinates, based on the second attitude correction acceleration and the estimated relative position.

With this configuration, the smoothed relative position with high accuracy can be output at the relative position (X, Y). Thus, the position of the aircraft 1 can be kept stable with high accuracy at the relative position (X, Y).

In a sixth aspect, the smoothing processing unit outputs the smoothed relative coordinates after applying a gain to the relative coordinates, when a frequency band that is higher than or equal to a motion frequency band in which the motion occurs is a first frequency band and a frequency band that is lower than the motion frequency band is a second frequency band, the gain in the first frequency band is lower than the gain in the second frequency band, and a damping coefficient (in the second frequency band satisfies $\zeta > 0.7$.

With this configuration, the first frequency band f1 has a sufficiently low gain compared to the second frequency band, which reduces the effect of the motion in the first frequency band f1. The second frequency band f2 has a larger damping coefficient ($\zeta > 0.7$), so that the low-frequency disturbance response is not oscillatory.

The aircraft 1 according to a seventh aspect includes an acceleration acquisition unit that acquires the acceleration of the aircraft, an attitude acquisition unit that acquires an attitude of the aircraft, an inertial velocity acquisition unit that acquires inertial velocity of the aircraft, a relative coordinate acquisition unit that acquires relative coordinates of the aircraft, and the aforementioned position control system 100 for the aircraft 1.

With this configuration, it is possible to provide the aircraft 1 with the flight controlled so that its position with respect to the target landing point 2 is stable, even when the target landing point 2 moves.

A position control method for the aircraft 1 according to an eighth aspect is the position control method for the aircraft to keep the aircraft at predetermined coordinates in an inertial space with respect to a target landing point that moves, and includes: a step of, based on acceleration of the aircraft and an attitude of the aircraft, outputting first attitude correction acceleration for correcting the acceleration of the aircraft; a step of, based on the first attitude correction acceleration and inertial velocity of the aircraft, outputting second attitude correction acceleration in which a drift component included in the first attitude correction acceleration is removed; and a step of, based on the second attitude correction acceleration and relative coordinates between the aircraft and the target landing point, outputting smoothed relative coordinates obtained by smoothing the relative coordinates.

With this configuration, the drift component included in the first attitude correction acceleration output based on the acquired acceleration of the aircraft 1 can be removed in the complementary filter 42. Therefore, since the smoothed relative coordinates can be acquired using the second attitude correction acceleration from which the drift component has been removed, the position of the aircraft 1 in the space can be stably kept even when the target landing point 2 moves.

REFERENCE SIGNS LIST

1 Aircraft
2 Target landing point
5 Vessel
7 Marker
10 Camera
20 Navigation device
30 Control unit
32 Image processing unit 34 Guidance calculation unit
36 Flight control unit
41 Acceleration correction processing unit
42 Complementary filter
43 Smoothing processing unit
46 Kalman filter
47 Relative velocity estimation processing unit
51 Pseudo-differential filter
52 Low-pass filter
53 High-pass filter
100 Position control system

The invention claimed is:

1. An aircraft position control system that keeps an aircraft at target coordinates in an inertial space with respect to a target landing point that moves, the aircraft position control system comprising:
an acceleration correction processing unit that, based on acceleration of the aircraft and an attitude of the aircraft, outputs first attitude correction acceleration in which the acceleration of the aircraft is converted from the acceleration in the aircraft axis coordinate system to the acceleration in inertial space coordinate system;
a complementary filter that, based on the first attitude correction acceleration and inertial velocity of the aircraft, outputs second attitude correction acceleration in which a drift component included in the first attitude correction acceleration is removed; and
a smoothing processing unit that, based on the second attitude correction acceleration and relative coordinates between the aircraft and the target landing point, outputs smoothed relative coordinates obtained by smoothing the relative coordinates,
wherein the relative coordinates include at least one of relative altitude between the aircraft and the target landing point in a vertical direction and a relative position between the aircraft and the target landing point in a horizontal plane,
for the relative coordinates including the relative position, the smoothing processing unit outputs a smoothed relative position as the smoothed relative coordinates,
flight of the aircraft is controlled based on the smoothed relative position.

2. The aircraft position control system according to claim 1, wherein the complementary filter combines a high-frequency component in which a low-frequency component included in an output value of the first attitude correction acceleration is removed, and a low-frequency component included in a derivative of the inertial velocity, and outputs the second attitude correction acceleration.

3. The aircraft position control system according to claim 1, wherein
the aircraft position control system further comprises a relative velocity estimation processing unit that, based on aircraft velocity of the aircraft and the relative position, outputs estimated relative velocity obtained by estimating relative velocity between the aircraft and the target landing point, and
flight of the aircraft is controlled based on the estimated relative velocity and the smoothed relative position.

4. The aircraft position control system according to claim 1, further comprising, for the relative coordinates including the relative position, a Kalman filter that outputs an estimated relative position estimated based on the relative position, and
flight of the aircraft is controlled based on the second attitude correction acceleration and the estimated relative position.

5. The aircraft position control system according to claim 1, wherein
the smoothing processing unit outputs the smoothed relative coordinates after applying a gain to the relative coordinates,
when a frequency band that is higher than or equal to a motion frequency band in which a motion occurs is a first frequency band and a frequency band that is lower than the motion frequency band is a second frequency band, the gain in the first frequency band is lower than the gain in the second frequency band, and
a damping coefficient $\zeta$ in the second frequency band satisfies $\zeta > 0.7$.

6. An aircraft comprising:
an acceleration acquisition unit that acquires acceleration of the aircraft;
an attitude acquisition unit that acquires an attitude of the aircraft;
an inertial velocity acquisition unit that acquires inertial velocity of the aircraft;
a relative coordinate acquisition unit that acquires relative coordinates of the aircraft; and
an aircraft position control system that keeps the aircraft at target coordinates in an inertial space with respect to a target landing point that moves, the aircraft position control system comprising:
an acceleration correction processing unit that, based on acceleration of the aircraft and an attitude of the aircraft, outputs first attitude correction acceleration in which the acceleration of the aircraft is converted from the acceleration in the aircraft axis coordinate system to the acceleration in inertial space coordinate system;
a complementary filter that, based on the first attitude correction acceleration and the inertial velocity of the aircraft, outputs second attitude correction acceleration in which a drift component included in the first attitude correction acceleration is removed; and
a smoothing processing unit that, based on the second attitude correction acceleration and relative coordinates between the aircraft and the target landing point, outputs smoothed relative coordinates obtained by smoothing the relative coordinates,
wherein the relative coordinates include at least one of relative altitude between the aircraft and the target landing point in a vertical direction and a relative position between the aircraft and the target landing point in a horizontal plane,
for the relative coordinates including the relative position, the smoothing processing unit outputs a smoothed relative position as the smoothed relative coordinates,
flight of the aircraft is controlled based on the smoothed relative position.

7. An aircraft position control method to keep an aircraft at predetermined coordinates in an inertial space with respect to a target landing point that moves, the aircraft position control method comprising:
outputting, based on acceleration of the aircraft and an attitude of the aircraft, first attitude correction acceleration in which the acceleration of the aircraft is converted from the acceleration in the aircraft axis coordinate system to the acceleration in inertial space coordinate system;
outputting, based on the first attitude correction acceleration and inertial velocity of the aircraft, second attitude correction acceleration in which a drift component included in the first attitude correction acceleration is removed; and outputting, based on the second attitude correction acceleration and relative coordinates between the aircraft and the target landing point, smoothed relative coordinates obtained by smoothing the relative coordinates, wherein the relative coordinates include at least one of relative altitude between the aircraft and the target landing point in a vertical direction and a relative position between the aircraft and the target landing point in a horizontal plane, for the relative coordinates including the relative position, the smoothing processing unit outputs a smoothed relative position as the smoothed relative coordinates, flight of the aircraft is controlled based on the smoothed relative position.

\* \* \* \* \*